United States Patent [19]

Jourdan et al.

[11] 4,088,397
[45] May 9, 1978

[54] OPTICAL DEVICE COMPRISING MECHANICAL CONNECTIONS TRANSVERSE TO THE OPTICAL PATH

[75] Inventors: Francis Jourdan; Jean-Paul Lepeytre; André Masson; Charles Le Roux, all of Paris, France

[73] Assignees: Thomson-CSF; Etablissements Pierre Angenieux, both of Paris, France

[21] Appl. No.: 725,156

[22] Filed: Sep. 21, 1976

[30] Foreign Application Priority Data

Sep. 24, 1975 France .............................. 75 29265

[51] Int. Cl.² .............................................. G02B 7/02
[52] U.S. Cl. .................................... 350/253; 350/199; 350/201
[58] Field of Search ............... 350/201, 199, 200, 252, 350/253, 187

[56] References Cited

U.S. PATENT DOCUMENTS

| | | |
|---|---|---|
| 2,817,270 | 12/1957 | Mandler ................................. 350/201 |
| 3,547,525 | 12/1970 | Rayces et al. ................... 350/201 X |
| 3,926,505 | 12/1975 | Rayces ................................. 350/201 |

Primary Examiner—Paul A. Sacher
Attorney, Agent, or Firm—Cushman, Darby & Cushman

[57] ABSTRACT

An optical device comprising at least an optical element having a cut away area and which supports an inner mechanical structure accommodated in the cut away area, the whole being supported by an outer mechanical structure without obstruction in the optical path between the structures. The contact areas of the optical element with the structures comprise mechanical gripping and position means including deformable members for holding an unvaried centered position to the optical element for severe temperature and mechanical operating conditions.

5 Claims, 7 Drawing Figures

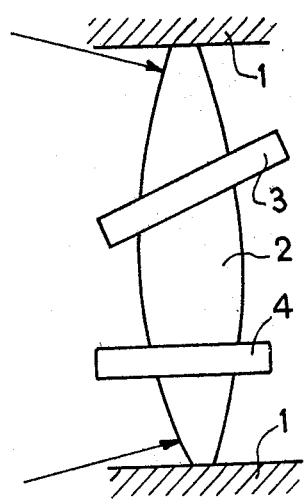
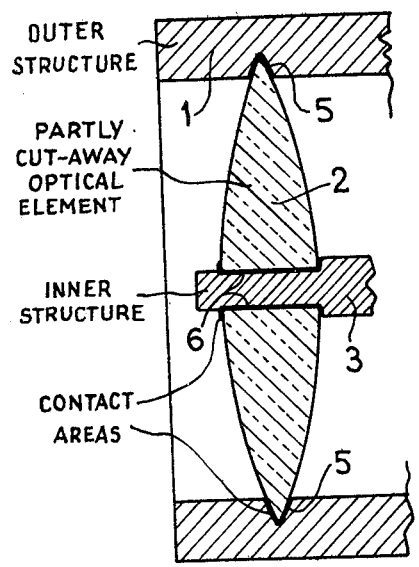
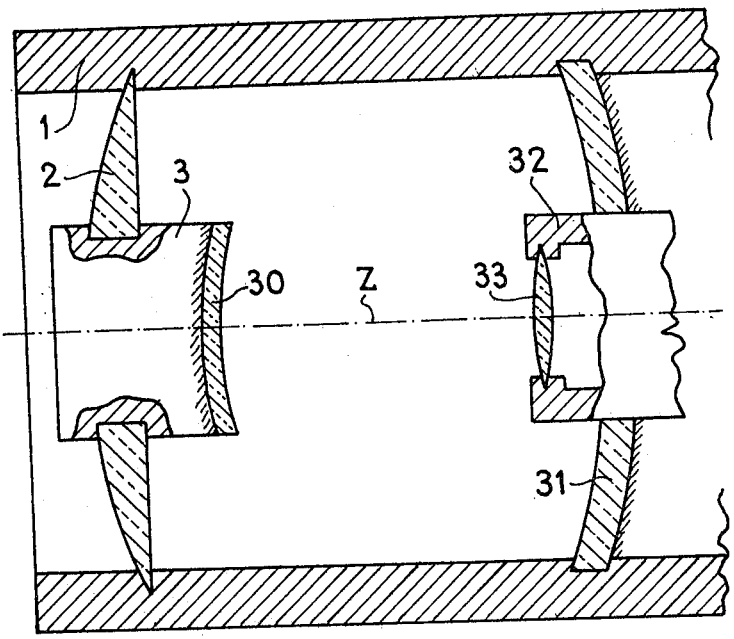

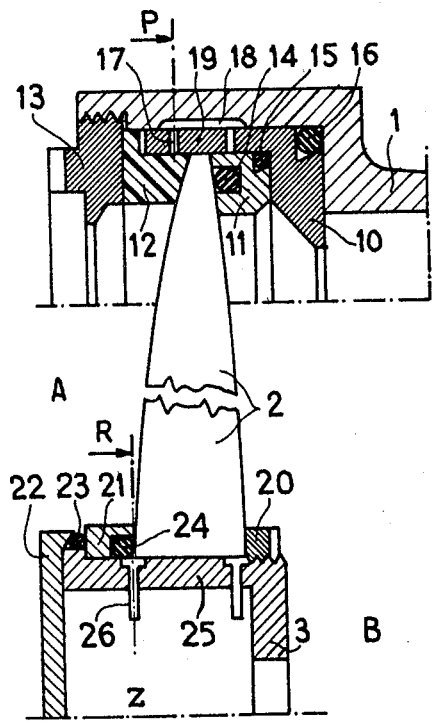
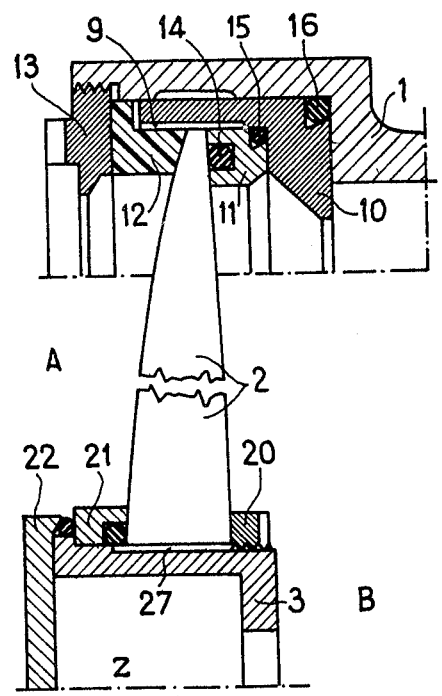
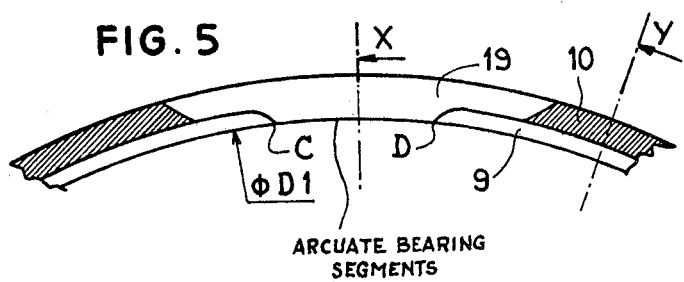
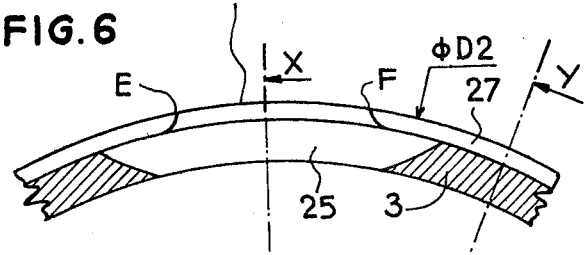

OPTICAL DEVICE COMPRISING MECHANICAL CONNECTIONS TRANSVERSE TO THE OPTICAL PATH

The present invention relates to an optical device in which a plurality of separate mechanical structures are to be joined together by mechanical connections passing through the optical path.

In such devices the mechanical connections in question are determined so that the obstruction which they cause to the optical combination utilized is rendered as small as possible. In this way, it is possible for the optical performance of the device to remain substantially unaffected.

This problem particularly exists with optical systems which comprise optical elements partly cut-away, generally at the centre, to accommodate an inner structure which, together with the optical elements themselves, is supported by an outer structure.

The solution generally adopted consists in effecting the connections by means of arms or spokes whose shape or dimensions are calculated to provide both the requisite mechanical strength under the planned operating conditions and also very little obstruction to the optical beam. Consequently, the thickness of these mechanical members in a plane transverse to that of the optical path is made as small as possible.

When the conditions under which operations have to take place are severe, in particular from the point of view of resistance to temperature, impacts and vibrations, sturdy mechanical connections have to be provided and the obstruction which these cause may be a hindrance from the point of view of the performance which is required from the optical combination in other respects.

An object of the invention is to provide an optical device which solves this problem by making use of one or more optical elements of the optical combination which, whilst continuing to perform their appointed optical function in the same way, further perform the function of providing mechanical connections between the various structures.

According to the invention, there is provided an optical device in which mechanical connections transverse to the optical path are to be provided, said optical device comprising: at least one optical element for providing said optical path and comprising a partly cut-away area, a first mechanical structure external to said optical path and supporting the said optical element, and at least a second mechanical structure accommodated in said cut-away area and secured to the first structure by said mechanical connections, said optical element comprising respective contact zones with the said structures arranged with mechanical gripping and positioning members.

The invention will now be further described with reference to the accompanying drawings, in which:

FIGS. 1 and 2 are simplified diagrams which illustrate, respectively, a type of optical device to which the invention relates and the principle utilized, FIGS. 3 to 6 show sections through part of an embodiment as shown in FIG. 2, and FIG. 7 shows schematically an embodiment of an optical system which comprises mechanical connections provided according to the invention.

An optical device of the type concerned, which is shown schematically in FIG. 1, has a first mechanical structure 1 to support one or more elements of the combination.

For reasons of simplicity, only one optical element 2 is shown in the diagram. One or more other mechanical structures, such as 3 and 4, which are separate from structure 1, are generally provided to support other optical elements belonging to the combination which are not shown. Structures 3 and 4 are arranged in cut-away areas of optical element 2 and need to be secured to structure 1 to ensure that the optical elements forming the combination are accurately positioned relative to one another.

The mechanical connections which are required between structures 3, 4 and structure 1 are produced by making use of the optical means 2 and for this reason do not in any way obstruct the optical combination. The areas of contact between the optical means 2 and the structures 1, 3 and 4 are arranged accordingly. These areas are shown at 5 and 6 in FIG. 2, which relates to a simplified example of an optical device only part of which is shown and which incorporates a lens 2. The lens 2 is supported by an outer structure 1 and supports an inner structure 3 which is located in a cut-away central area of the lens.

Areas 5 and 6 are arranged particularly to take account of the differing nature of the materials in contact, of the accuracy to be observed in their relative positions, and of the climatic and mechanical environmental conditions in which the device is required to operate.

An embodiment corresponding to the partial diagram in FIG. 2 is shown in the succeeding FIGS. 3 to 6.

The optical element 2 is centered in the outer structure 1 and is held in position by a mounting ring formed by two parts 10 and 11, a pressure washer 12 and a nut 13. Element 2 is clamped by tightning nut 13. The mounting ring contains seatings to hold O-rings 14, 15 and 16 on the side on which the external structure 1 is situated and these O-rings form a seal around the circular periphery of the optical element 2 between the media A and B situated on either side of it. Medium A may for example be the ambient external medium and medium B an internal medium in the piece of equipment. The connecting members need to ensure that the optical element 2 is held in place correctly and without damage when the environmental temperature conditions are likely to vary over a wide range such as −55° to +70° C. For this purpose, the washer 12, whose bearing face applied to element 2 is matched to the shape of the latter, is made of a material having appropriate mechanical characteristics to enable the changes which occur in the dimensions of the parts in the planned temperature range to be taken up by elastic deformation. The pressure washer 12 may in particular be made from a plastics material. Also, part 10 of the mounting ring is provided with slots 17 which are situated opposite a circular recess 18 in structure 1. FIG. 5 is a partial cross-section through part 10 in a plane of section P which passes through a slot 17. Part 10 contains two sets of eight regularly distributed slots and internal recessed portions 9, which give it a certain degree of elasticity which it requires, particularly at low temperatures, in order to be able to take up the changes in the dimensions of the metal parts 1 and 10 without risk of damage to the optical element 2. The variations in the dimensions of the metal parts 1 and 10 are greater than those experienced by element 2, which is made of glass, and they result in a constrictive pressure on the optical element as a result of a reduction in the diameter D1 defining the centered position i.e. the position of the optical axis Z. The slots define eight arcuate segments 19 which are diametrically opposed in pairs and which are able to deform elastically to take up the variations in diameter which occur at low temperatures and to hold the constrictive pressure at an acceptable level which does not cause damage to the optical element. The outer periphery of the latter bears against the arcuate segments 19 of part 10, with the slots 17 and the recessed portions 9 lying outside the supporting areas (CD FIG. 5). The dimensions of the slots and the arcuate segments are so calculated that the deformations which have to be accepted are compatible with the limiting elastic characteristics of the material forming part 10 of the mounting ring. Thus, the special provisions made by selecting the material of part 12 and by providing the deformable arcuate segments of part 10 result in resilient connecting means which enable the optical element to be held in position and thus centered without risk of damage under the severe environmental conditions to which it is subject. FIGS. 3 and 4, are respectively, a section in a section-plane X passing through the area in which the slots are situated and a section in a section-plane Y away from the slots.

The connections to the inner structure 3 are produced in a similar way and are shown in FIGS. 3, 4 and 6. Structure 3 is centered by and bears against optical element 2. Lateral support is provided by tightening a nut 20 and by means of a washer 21, one face of which follows the shape of the front surface of lens 2. Part 22 forms a sealing cap on the side of the inner structure 3 on which medium A is situated. A seal between media A and B is provided by O-rings 23 and 24. Diametric support for optical element 2 is provided as above by arcuate segments 25 (EF in FIG. 6 which is a vertical section in plane R through a slot 26). The segments 25 are delimited by an array of slots 26 and recessed portions 27 (FIG. 4). Since parts 2 and 3 are made of different materials, one being made of glass and the other of metal, temperature variations affect them differently. At high temperatures, the variations in the centering diameter D2 is a result of expansion, which is greater for the inner structure 3, is absorbed without danger to the lens 2 by deformation of the inner structure, which contains slots 26 and recessed portions 27 between successive arcuate segments 25. The elastic deformation which occurs following a rise in temperature restricts pressure on the optical element 2 in a direction transverse to the optical axis to a level which the latter is able to withstand.

The combined action of the members which connect the optical element 2 to structures 1 and 3 enable the optical axis Z of element 2 to be held in the correct position under the mechanical and climatic environmental conditions which are anticipated, the optical element 2 supporting the inner structure 3.

FIG. 7 shows an application of the optical device to a catadioptric system in which the optical combination comprises two lenses 2 and 33 and two mirrors 30 and 31. The secondary mirror 30 is supported by the inner structure 3. The main mirror 31 carries a second inner structure 32 which in turn supports lens 33. The mechanical connections between optical element 31 and structures 1 and 32 are produced in a similar way to those described above in the case of assembly 1, 2 and 3.

In the optical device described, the mechanical means which provide the transverse connections required between the various structures to be connected are made of a transparent material, which, in the optical path of the light radiation, is formed by the material of the optical elements belonging to the optical combination. For this reason, there is no additional obstruction from these mechanical means other than that which inevitably arises from inner structures situated in the cut-away parts of the optical elements. In a system of the type shown in FIG. 7, the sole cause of partial obstruction is the inner entry structure 3. For reasons of simplicity, the optical connecting members shown in the Figures have been restricted to a single optical element whose centre is cut-away but it is understood that this element could be a plurality of elements and as an example elements 2 and 33 (FIG. 7) could each consist of a group of lenses. It is like-wise understood that not all the inner structures have necessarily to support one or more optical elements of the combination and they may be used for other purposes.

Of course the invention is not limited to the embodiment described and shown which was given solely by way of example.

What is claimed is:

1. An optical device comprising: at least one optical element having a cut-away area along the optical axis, an outer mechanical structure for supporting peripherally the said optical element, an inner mechanical structure accommodated in said cut-away area and secured to the outer structure by mechanical connections, said connections being formed by said optical element and mechanical gripping and positioning members arranged in the respective contact between the optical element and the said structure to provide any obstruction along the optical path, comprised between the said structure, the said mechanical gripping and positioning members comprising deformable elastic members for holding substantially an unvaried centered position to said optical element for predetermined severe temperature and mechanical operating conditions, the said deformable members comprising, in each contact zone, at least one mechanical part provided with deformable arcuate segments against which sad optical element bears.

2. An optical device according to claim 1, comprising a combination of optical elements in which a said optical element is cut-away in its central portion, the said mechanical deformable members comprising, in the case of both structures, a cylindrical part provided with two sets of regularly distributed slots and with recessed areas to form the said arcuate bearing segments.

3. An optical device according to claim 2, wherein the said cut-away optical element forms the optical input element of the said optical combination, and wherein the said mechanical gripping and positioning members include seals, for isolating an external ambient medium from an internal medium.

4. An optical device according to claim 2, wherein the said mechanical gripping and positioning members include at least one washer which bears laterally against the said cut-away optical element, the said washer being made of a plastics material of predetermined elasticity.

5. A device according to claim 1, comprising an optical combination catadioptic system formed by at least one cut-away lens supporting a first inner structure, a main cut-away mirror supporting a second inner structure, a secondary mirror supported by the first inner structure, and at least one lens supported by the second inner structure, the said first mechanical structure supporting the said optical combination by said mechanical connections comprising the said first lens and the said main mirror.

* * * * *